(12) United States Patent
Takaichi et al.

(10) Patent No.: US 9,330,840 B2
(45) Date of Patent: May 3, 2016

(54) APPARATUS FOR MANUFACTURING FIELD POLE MAGNETIC BODY

(71) Applicant: NISSAN MOTOR CO., LTD., Yokohama-shi, Kanagawa (JP)

(72) Inventors: Kazuhiro Takaichi, Yokohama (JP); Kimio Nishimura, Yokohama (JP); Hideki Watanabe, Sagamihara (JP); Takashi Sekikawa, Yokohama (JP); Yasushi Matsushita, Yokohama (JP); Akihisa Hori, Yokohama (JP); Takumi Ohshima, Yokohama (JP); Michito Kishi, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/414,244

(22) PCT Filed: Jun. 12, 2013

(86) PCT No.: PCT/JP2013/066204
§ 371 (c)(1),
(2) Date: Jan. 12, 2015

(87) PCT Pub. No.: WO2014/010363
PCT Pub. Date: Jan. 16, 2014

(65) Prior Publication Data
US 2015/0143691 A1     May 28, 2015

(30) Foreign Application Priority Data

Jul. 13, 2012   (JP) .................. 2012-157586

(51) Int. Cl.
*H02K 15/03*      (2006.01)
*H01F 41/02*      (2006.01)
*H02K 15/14*      (2006.01)

(52) U.S. Cl.
CPC ............ *H01F 41/0206* (2013.01); *H02K 15/03* (2013.01); *H02K 15/14* (2013.01); *Y10T 29/5317* (2015.01)

(58) Field of Classification Search
CPC .... H01F 41/0253; H01F 7/0205; H02K 15/03
USPC .................. 29/596–598; 310/156.07, 156.12, 310/156.38
See application file for complete search history.

(56) References Cited

U.S. PATENT DOCUMENTS 4,126,933 A * 11/1978 Anderson ................ H02K 1/28
29/598
4,777,717 A * 10/1988 Okamoto ................ H02K 1/17
29/596

(Continued)

FOREIGN PATENT DOCUMENTS

| CN | 101763929 A | 6/2010 |
| EP | 2 461 461 A1 | 6/2012 |
| JP | 2004-328927 A | 11/2004 |
| JP | 2009-142081 A | 6/2009 |
| WO | WO 2011/158710 A1 | 12/2011 |

*Primary Examiner* — Minh Trinh
(74) *Attorney, Agent, or Firm* — Foley & Lardner LLP

(57) ABSTRACT

An apparatus for manufacturing a field pole magnetic body formed by laminating magnet segments produced by cutting and dividing a permanent magnet and to be arranged in a rotary electric machine includes a housing part adapted to successively house a plurality of the magnet segments having adhesive applied to cut surfaces with the cut surfaces facing each other and has an inner side surface adjacent to outer side surfaces of the housed magnet segments, and a pressing unit adapted to press the magnet segments housed in the housing part toward a bottom part of the housing part in a longitudinal direction. The magnet segments are restrained in a width direction and a thickness direction by the inner side surface of the housing part when the magnet segments are pressed by the pressing unit.

8 Claims, 22 Drawing Sheets

(56) References Cited

U.S. PATENT DOCUMENTS

| | | | | |
|---|---|---|---|---|
| 4,918,802 A | * | 4/1990 | Schaefer | H02K 1/278 29/598 |
| 8,747,583 B2 | * | 6/2014 | Takaichi | H01F 41/0253 156/580 |
| 8,819,921 B2 | * | 9/2014 | Adachi | H01F 7/0221 29/417 |
| 2012/0036696 A1 | * | 2/2012 | Murakami | H01F 7/0221 29/426.2 |
| 2013/0087265 A1 | | 4/2013 | Takaichi et al. | |

* cited by examiner

APPARATUS FOR MANUFACTURING FIELD POLE MAGNETIC BODY

TECHNICAL FIELD

The present invention relates to an apparatus for manufacturing a field pole magnetic body formed by laminating magnet segments produced by cutting and dividing a permanent magnet and to be arranged in a rotary electric machine.

BACKGROUND ART

A field pole magnetic body formed by bonding and laminating a plurality of magnet segments obtained by cutting a plate-like magnetic body (hereinafter, merely referred to as a "magnetic body") to each other is known as a field pole magnetic body to be arranged in a rotor core of a permanent magnet embedded rotary electric machine. Since such a field pole magnetic body is formed of a plurality of magnet segments, the volumes of the individual magnet segments can be reduced and eddy currents generated in the magnet segments due to a variation of a magnetic field caused by the rotation of a rotor can be reduced. This can suppress heat generation of the field pole magnetic body associated with the generation of the eddy currents and prevent irreversible thermal demagnetization.

It is disclosed in JP2009-142081A to arrange the above field pole magnetic body in a rotor slot of an IPM motor.

SUMMARY OF INVENTION

Since the field pole magnetic body needs to be properly housed in the rotor slot, outer shape dimensions thereof in a width direction and a thickness direction are limited within predetermined specs. A spec is, for example, set to be within a value obtained by adding a predetermined value to a tolerance maximum value of a dimension of a rough material of a magnetic body.

To set the field pole magnetic body within specs, it is considered to restrain six surfaces of the magnet segments in a laminated state and bond the magnet segments to each other by a magnet restraining tool in a magnet segment lamination process. The magnet restraining tool is, for example, such that plane and side surfaces of the cut individual magnet segments are brought into contact with a tool as a reference and the magnet segment are pressed in the width and thickness directions to be aligned by pressing members. Further, the magnet restraining tool bonds cut surfaces to each other by pressing the magnet segments pressed against each other in a longitudinal direction.

However, since the magnet restraining tool as described above is structured to press the magnet segments independently in the width, thickness and longitudinal directions to restrain the magnet segments, a tool structure is complicated and manufacturing cost for the tool increases. In addition, maintenance is cumbersome. Further, since it is necessary to provide the pressing members for performing a restraining operation in each of the width, thickness and longitudinal directions when the magnet segments are restrained, investment in equipment increases by the cost of the pressing members.

An object of the present invention is to simplify the structure of a magnet restraining tool capable of restraining magnet segments in width, thickness and longitudinal directions.

According to one aspect of the present invention, an apparatus is provided which manufactures a field pole magnetic body formed by laminating magnet segments produced by cutting and dividing a permanent magnet and to be arranged in a rotary electric machine. This manufacturing apparatus includes a housing part adapted to successively house a plurality of the magnet segments having adhesive applied to cut surfaces with the cut surfaces facing each other and has an inner side surface adjacent to outer side surfaces of the housed magnet segments, and a pressing unit adapted to press the magnet segments housed in the housing part toward a bottom part of the housing part in a longitudinal direction. The magnet segments are restrained in a width direction and a thickness direction by the inner side surface of the housing part when the magnet segments are pressed by the pressing unit.

Embodiments and advantages of the present invention are described in detail below with reference to the accompanying drawings.

DESCRIPTION OF EMBODIMENTS

Hereinafter, embodiments of the present invention are described in detail with reference to the drawings.

First, the first embodiment is described.

Figure 1A:
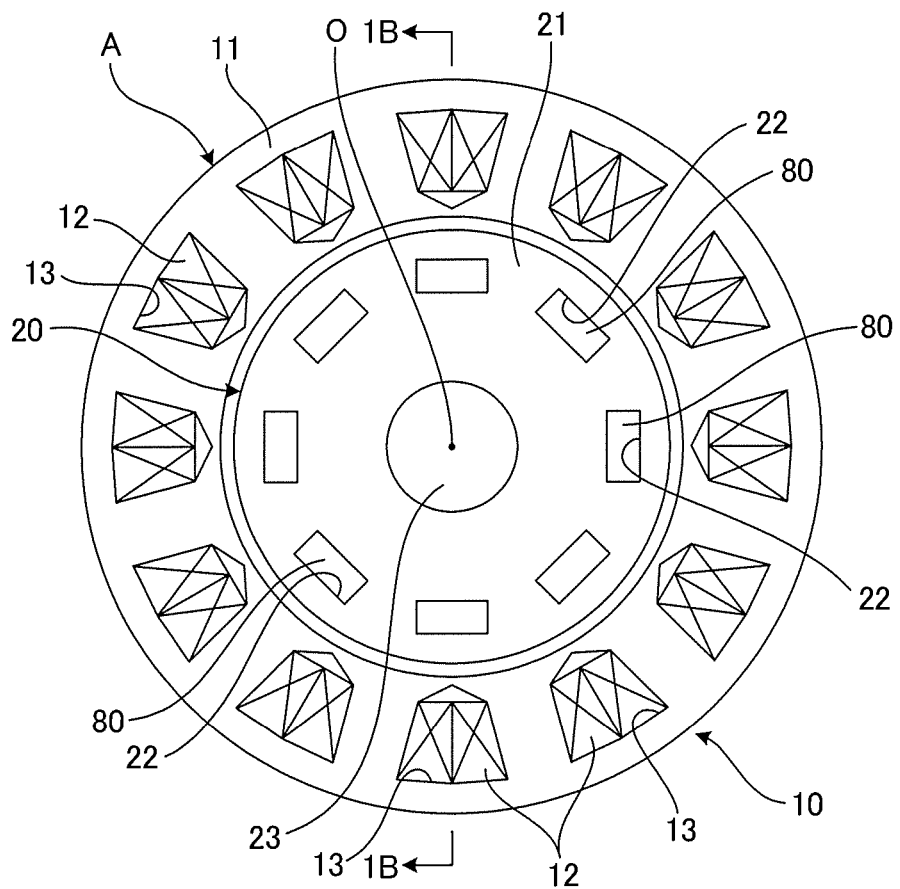
FIG. 1A is a schematic configuration diagram showing the configuration of a main part of a permanent magnet rotary electric machine to which a field pole magnetic body composed of magnet segments and manufactured by a manufacturing apparatus according to an embodiment is applied.
Figure 1B:
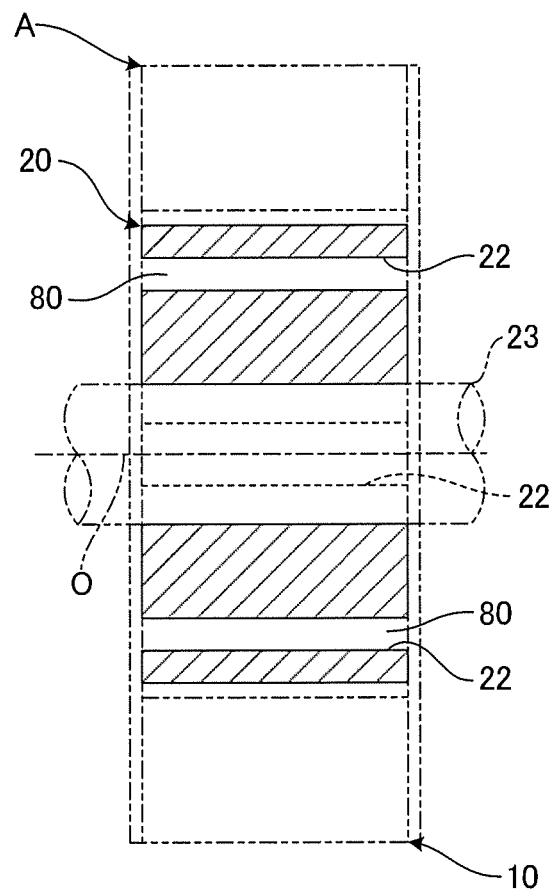
FIG. 1B is a sectional view showing a cross-section along 1B-1B of the permanent magnet rotary electric machine of FIG. 1A.

FIG. 1A and FIG. 1B showing a cross-section along 1B-1B of FIG. 1A show a permanent magnet embedded rotary electric machine A (hereinafter, merely referred to as a "rotary electric machine A") to which a field pole magnetic body 80 composed of magnet segments manufactured by a manufacturing apparatus in the present embodiment is applied.

The rotary electric machine A is composed of a stator 10 having a circular ring shape and constituting a part of a casing, and a cylindrical rotor 20 arranged coaxially with this stator 10.

The stator 10 is composed of a stator core 11 and a plurality of coils 12, and the plurality of coils 12 are housed in slots 13 formed at equal angular intervals on the same circumference centered on an axis center O on the stator core 11.

The rotor 20 is composed of a rotor core 21, a rotary shaft 23 which integrally rotates with the rotor core 21 and a plurality of field pole magnetic bodies 80, and the plurality of field pole magnetic bodies 80 are housed in slots 22 formed at equal angular intervals on the same circumference centered on the axis center O.

Figure 2:
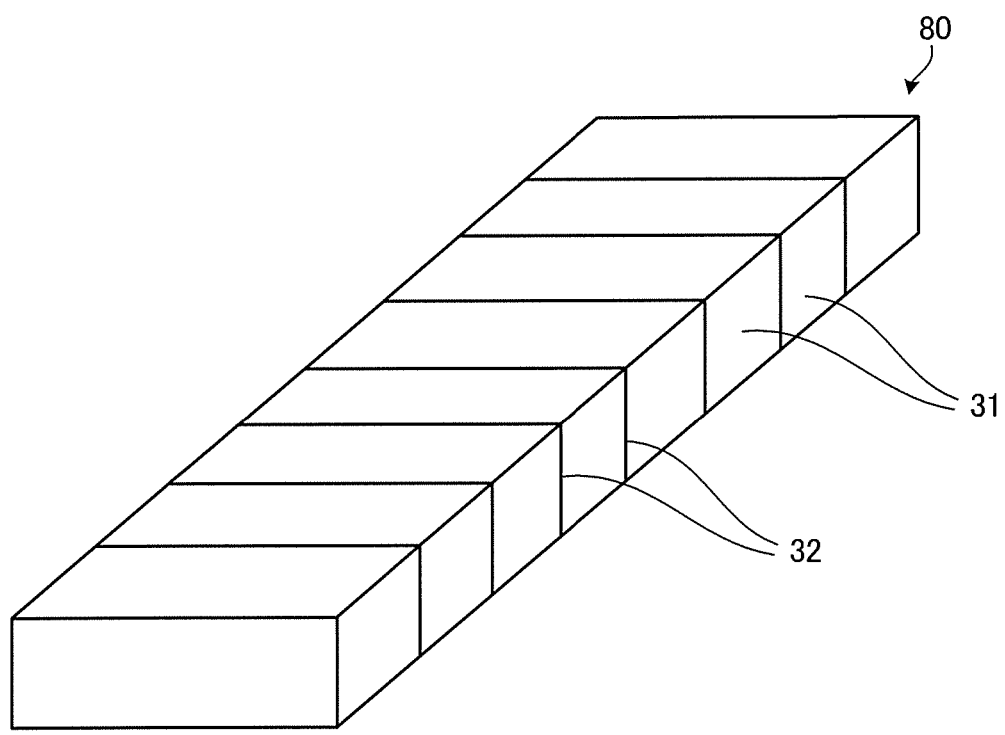
FIG. 2 is a configuration diagram showing the configuration of the field pole magnetic body.

The field pole magnetic body 80 housed in the slot 22 of the rotor 20 is formed as an aggregate of magnet segments 31 in which a plurality of magnet segments 31 are aligned in a row as shown in FIG. 2. The magnet segments 31 are manufactured by cutting a plate-like magnetic body 30 (FIG. 3A) having upper and lower surfaces having a rectangular shape along a shorter side direction of the rectangular shape. The field pole magnetic body 80 is formed by bonding cut surfaces of the plurality of divided magnet segments 31 by resin 32.

Examples of the used resin 32 include epoxy-based thermally curing adhesive, UV curing adhesive and two-liquid room temperature curing adhesive. Further, such an adhesive is blended with a spacer to ensure clearances between the magnet segments 31. Examples of the spacer include glass beads, resin beads and insulation cloth.

The adjacent magnet segments 31 are bonded via the above adhesive and spacer and electrically insulated. In this way, eddy currents generated in the magnet segments 31 due to a variation of an acting magnetic field can be reduced by being retained in the individual magnet segments 31 and irreversible thermal demagnetization can be prevented by suppressing heat generation of the field pole magnetic body 80 associated with the eddy currents.

To cut the magnetic body 30 into the plurality of magnet segments 31, it is effective to form notched grooves 33 (FIG. 3A) in advance on parts where the magnetic body 30 is scheduled to be cut. Although the magnetic body 30 formed with the notched grooves 33 is described below, these notched grooves 33 are not absolutely essential and may not be provided on the magnetic body 30 if the magnetic body 30 can be cut even if the notched grooves 33 are not provided. The flatness of the cut surfaces when the magnetic body 30 is cut into the magnet segments 31 is improved as the depths of the provided notched grooves 33 from the surface increase and as the tips of the notched grooves 33 become more pointed.

Methods for forming the notched grooves 33 include a method for providing the notched grooves 33 in a molding process of the magnetic body 30 by groove-forming projections provided on a molding die for the magnetic body 30, a method by machining such as dicing or slicing, a method by laser beam irradiation and a method by wire cut discharge machining.

Figure 3A:
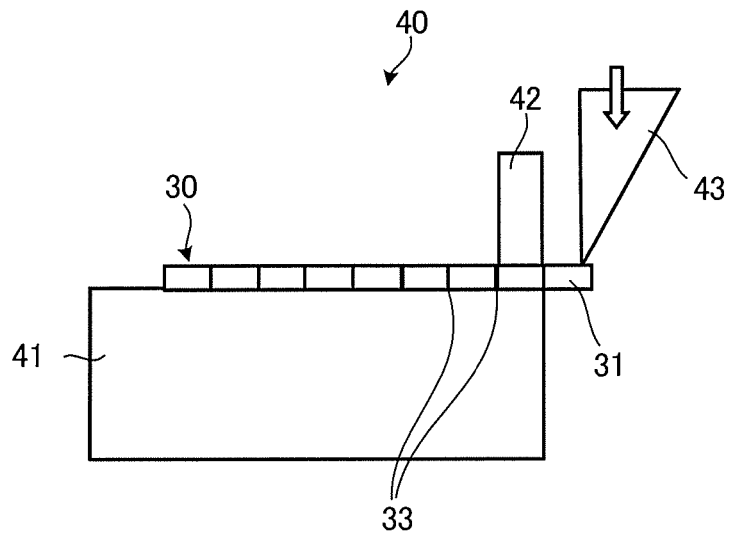
FIG. 3A is a diagram showing a magnetic body cutting process.

FIG. 3A shows an example of a cantilever-type cutting apparatus 40 for cutting the magnetic body 30 into the plurality of magnet segments 31. The cantilever-type cutting apparatus 40 successively feeds the magnetic body 30 placed on a die 41 by one magnet segment in a longitudinal direction. Further, the magnetic body 30 on the die 41 is pressed downwardly by a magnet presser 42 in a state where the magnetic body 30 is protruding from one end of the die 41 by one magnet segment. The feed and positioning of the magnetic body 30 are performed using a servo mechanism or the like. The magnet presser 42 presses the magnetic body 30 by bolt fastening, hydraulic pressure, air pressure or the like.

A punch 43 is lowered to press the magnetic body 30 downwardly, thereby cutting the magnetic body 30, in the state where the magnetic body 30 is protruding from the one end of the die 41 by one magnet segment. The punch 43 is driven by a servo press, a machine press, a hydraulic press or the like.

Figure 3B:
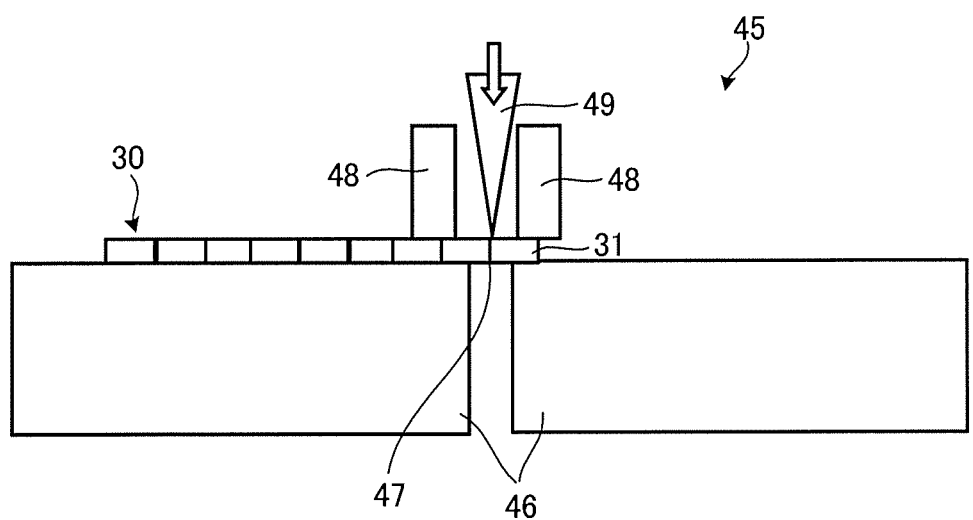
FIG. 3B is a diagram showing the magnetic body cutting process.

FIG. 3B shows an example of a cutting apparatus 45 of a three-point bending type for cutting the magnetic body 30 into the plurality of magnet segments 31. The cutting apparatus 45 of the three-point bending type successively feeds the magnetic body 30 bridged on a pair of dies 46 by one magnet segment in a longitudinal direction and positions the magnetic body 30 so that a scheduled cutting part 47 is located in the center between the pair of dies 46. In this state, the magnetic body 30 on each die 46 is pressed downwardly by a magnet presser 48. It should be noted that, as in FIG. 3A, the feed and positioning of the magnetic body 30 are performed using a servo mechanism or the like and the magnet pressers 48 press the magnetic body 30 by bolt fastening, hydraulic pressure, air pressure or the like.

Then, a punch 49 arranged above the center between the pair of dies 46 is lowered to press the magnetic body 30 downwardly, thereby cutting the magnetic body 30. The punch 49 is driven by a servo press, a machine press, a hydraulic press or the like.

The magnet segments 31 cut in this way are bonded by the resin and united to become the field pole magnetic body 80. Since the field pole magnetic body 80 is housed in the slot 22 of the rotor 20 in an assembling process of the rotary electric machine A, outer shape dimensions in the width and thickness directions need to be limited within predetermined specs. If the outer shape dimensions of the field pole magnetic body 80 become larger than the predetermined specs, the field pole magnetic body 80 cannot be inserted into the slot 22. Accordingly, the predetermined specs are, for example, set at values slightly larger than maximum values of dimensions of a rough material of the magnet segments 31 in the width and thickness directions.

Figure 4A:
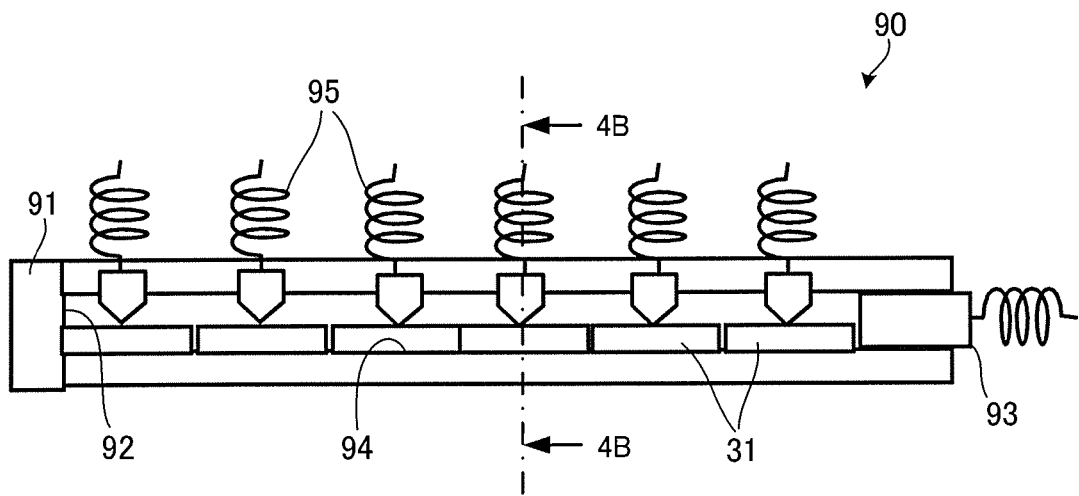
FIG. 4A is a sectional view showing a magnet restraining tool used in a magnet segment lamination process in a comparative example.
Figure 4B:
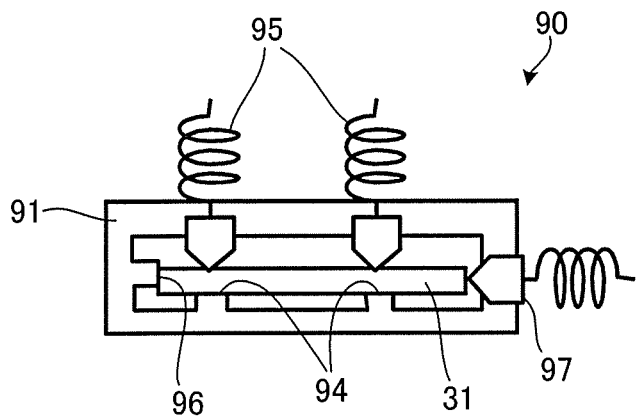
FIG. 4B is a sectional view showing a cross-section along 4B-4B of FIG. 4A.

FIG. 4A is a sectional view showing a magnet restraining tool 90 used in a process of laminating the magnet segments 31 in a comparative example. FIG. 4B is a sectional view showing a cross-section along 4B-4B of FIG. 4A.

The magnet restraining tool 90 includes a reference tool 91 formed with reference surfaces in thickness, width and longitudinal directions for supporting a plurality of magnet segments 31 in the thickness, width and longitudinal directions. Further, the magnet restraining tool 90 includes a longitudinal-direction pressing part 93 for pressing the plurality of magnet segments 31 toward a longitudinal-direction reference surface 92 of the restraining tool 91, a thickness-direction pressing part 95 for pressing the plurality of magnet segments 31 toward a thickness-direction reference surface 94 of the restraining tool, and a width-direction pressing part 97 for pressing the plurality of magnet segments 31 toward a width-direction reference surface 96 of the restraining tool.

The magnet restraining tool 90 presses all the magnet segments 31 against the longitudinal-direction reference surface 92 in a state where the plurality of magnet segments 31 aligned in a row are pressed against the thickness-direction reference surface 94 and the width-direction reference surface 96. In this way, the six surfaces of the laminated magnetic body 30 are restrained by the magnet restraining tool 90 and the magnet segments 31 are united by curing the adhesive in this state.

Figure 5A:
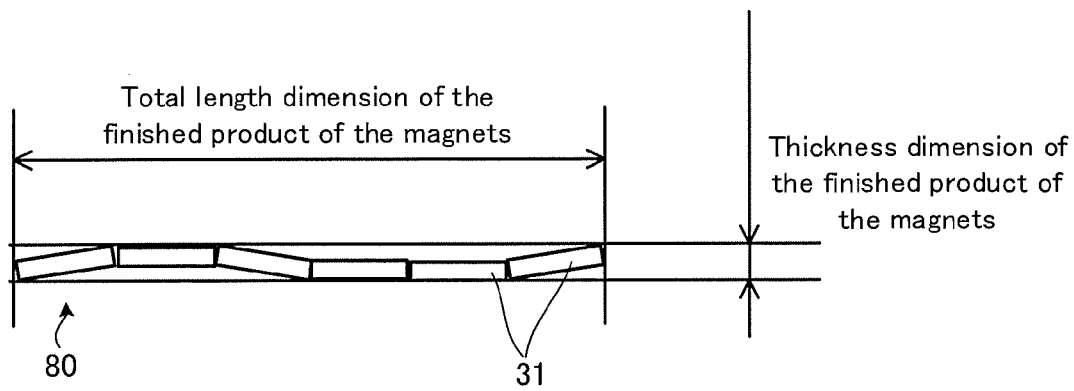
FIG. 5A is a diagram showing dimensions of the magnetic body after completion.
Figure 5B:
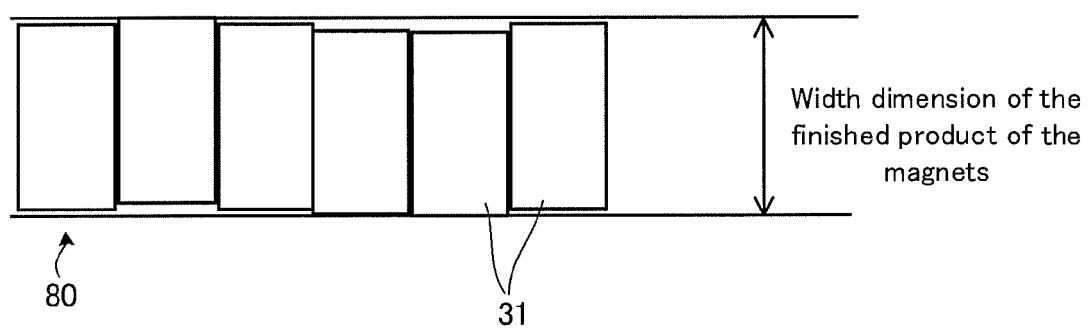
FIG. 5B is a diagram showing a dimension of the magnetic body after completion.

By adjusting pressing forces of the thickness-direction pressing part 95, the width-direction pressing part 97 and the longitudinal-direction pressing part 93 at the time of restraining the magnet segments 31 in this way, the outer shape dimensions of the magnetic body 80 after completion can be adjusted. The entire length, thickness and width of the magnetic body 80 after completion are measured in a dimension inspection process as shown in FIGS. 5A and 5B and checked whether or not these dimensions are within the predetermined specs.

Since the thickness-direction pressing part 95, the width-direction pressing part 97 and the longitudinal-direction pressing part 93 are structured to be independently driven in such a magnet restraining tool 90, the structure of the magnet restraining tool 90 is complicated and manufacturing cost for the tool 90 increases. Further, a maintenance work becomes cumbersome due to the complicated structure.

Further, since a restraining operation needs to be performed in the thickness, width and longitudinal directions to restrain the magnet segments 31, a drive source needs to be provided for each of the pressing parts 93, 95 and 97, leading to an increase in investment in equipment.

Further, since it is necessary to measure the entire length, thickness and width of the finished magnetic body 80 and check whether or not each value is within the predetermined spec in the dimension inspection process, the dimension inspection process becomes cumbersome and manufacturing cost increases.

Accordingly, in the present embodiment, the lamination process is performed using the following magnet restraining tool 50.

Figure 6A:
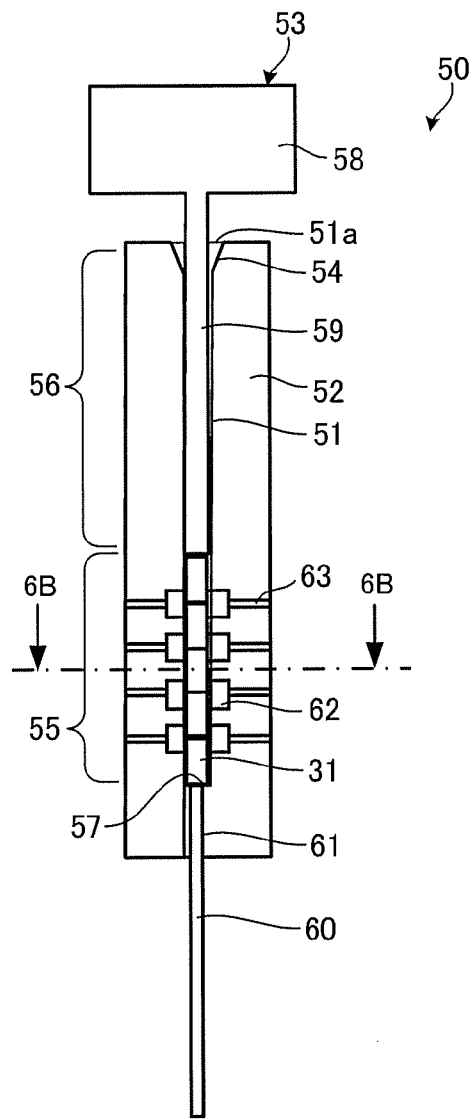
FIG. 6A is a sectional view showing a magnet restraining tool used in a magnet segment lamination process in the first embodiment.
Figure 6B:
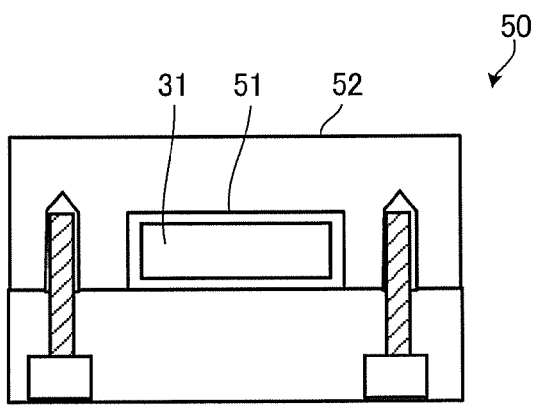
FIG. 6B is a sectional view showing a cross-section along 6B-6B of FIG. 6A.

FIG. 6A is a sectional view showing the magnet restraining tool 50 used in the lamination process of the magnet segments 31 in the present embodiment. FIG. 6B is a sectional view showing a cross-section along 6B-6B of FIG. 6A.

The magnet restraining tool 50 includes a laminating tool 52 having a box-shaped rectangular parallelepipedic body and including a housing part 51 for housing the magnet segments 31 in a longitudinal direction, and a lid part 53 for closing an opening 51a of the housing part 51 by being inserted into the housing part 51.

The housing part 51 is open on one longitudinal end side of the laminating tool 52 and successively houses the magnet segments 31 in a row with the cut surfaces facing each other.

Inner dimensions of the housing part 51 are set to be slightly larger than outer dimensions of the magnet segments 31 in the width and thickness directions, and outer side surfaces of the magnet segments 31 are adjacent to inner side surfaces of the housing part 51 over the entire circumference when the magnet segments 31 are housed (FIG. 6B). Further, the housing part 51 includes a tapered part 54 having inner dimensions gradually increased toward the opening 51a near the opening 51a.

The housing part 51 has two regions including a bonding region 55 and a guide region 56 along the longitudinal direction. The bonding region 55 is a region on the side of a bottom surface 57 adjacent to the magnet segments 31 when the magnet segments 31 are bonded, and the guide region 56 is a region which is closer to the opening 51a than the bonding region 55 through which the magnetic body 80 after completion passes when being pushed out of the housing part 51.

The inner dimensions of the housing part 51 in the bonding region 55 are set to be slightly larger than maximum values of dimensional tolerances of the magnet segments 31 (maximum allowable dimensions). This enables all the magnet segments 31 thrown into the housing part 51 to reach the bonding area 55 without being caught between the inner side surfaces of the housing part 51.

Further, the inner dimensions of the housing part 51 in the guide region 56 are set at maximum values of dimensional tolerances of the laminated and bonded magnetic body 80 after completion (maximum values within specs of a finished product). In this way, all the dimensions of the magnetic body 80 after completion discharged from the housing part 51 after passing through the guide region 56 are within the specs. It should be noted that since the maximum values of the dimensional tolerances of the magnetic body 80 after completion are set at values larger than the maximum values of the dimensional tolerances of the magnet segments 31, the magnet segments 31 thrown into the housing part 51 are not caught between the inner side surfaces in the guide region 56.

The lid part 53 is composed of a block part 58 having a predetermined weight and an inserting part 59 extending from the block part 58 and to be inserted into the housing part 51. A length of the inserting part 59 is set to be longer than a length from the rear end of the magnet segments 31 to the opening of the housing part 51 when a necessary number of magnet segments 31 are housed in the housing part 51. This enables the magnet segments 31 to be pressed toward the bottom surface 57 of the housing part 51 by the own weight of the block part 58 by inserting the lid part 53 into the housing part 51 with the magnet segments 31 housed in the housing part 51.

The magnet restraining tool 50 further includes a pusher hole 61 penetrating from a surface of the housing part 51 opposite to the opening 51a to the bottom surface 57 of the housing part 51 and a pusher 60 to be retractably inserted into the pusher hole 61 to push the magnetic body 80 after completion in contact with the bottom surface 57 and force it out of the housing part 51.

The pusher 60 can wait in such a manner that a tip is located in the pusher hole 61 during the bonding of the magnet segments 31 and force the magnetic body 80 after completion upward out of the housing part 51 by moving upward from the bottom surface of the housing part 51 after bonding. Thus, diameters of the pusher 60 and the pusher hole 61 are set at such values that the magnet segments 31 housed in the housing part 51 do not fall down.

The magnet restraining tool 50 further includes grooves 62 formed on an inner side surface of the bonding region 55 and located to face the cutting surfaces between the magnet segments 31 when the necessary number of magnet segments 31 are housed. The grooves 62 are formed over the outer peripheries of bonded parts between the magnet segments 31. This can prevent the adhesive from adhering to the inner side surfaces of the housing part 51 even if the adhesive protrudes from the bonding part between the magnet segments 31 when the magnet segments 31 in the housing part 51 are restrained. Further, each groove 62 communicates with an outside atmosphere through a communication hole 63. In this way, a vaporization component produced when the adhesive is cured can be discharged to outside.

Next, the lamination step of laminating and bonding the magnet segments 31 using the magnet restraining tool 50 is described with reference to FIGS. 7A to 7G.

The magnet segments 31 are thrown into the housing part 51 of the laminating tool 52 by a magnet segment transfer tool 64 movable to an upper side of the housing part 51. A number of (e.g. five) magnet segments 31 to be thrown into the housing part 51 are placed on the magnet segment transfer tool 64 in a direction perpendicular to the planes of FIGS. 7A to 7G and a bottom surface is opened and closed by an opening and closing member provided at an end bottom surface. When the bottom surface is opened, the magnet segment 31 on an end part falls down into the housing part 51 and the magnet segment transfer tool 64 moves the remaining placed magnet segments 31 toward the end part after the bottom surface is closed. When the end bottom surface is opened again, the magnet segment 31 on the end part falls down into the housing part 51. The magnet segment transfer tool 64 successively throws the number of magnet segments 31 into the housing part 51 by repeating the above operation.

It should be noted that although the magnet segments 31 are thrown into the housing part 51 by the magnet segment transfer tool 64 in the present embodiment, it is also possible to successively throw the magnet segments 31 into the housing part 51, instead, by robot picking.

Figure 7A:
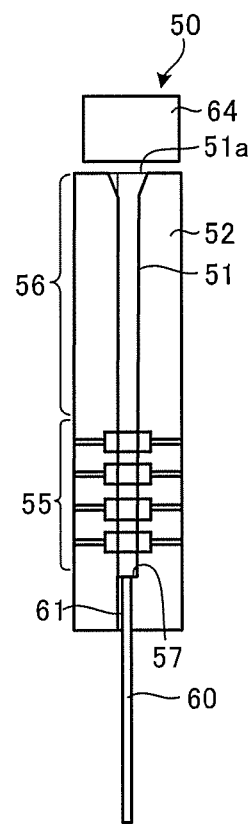
FIG. 7A is a diagram showing the magnet segment lamination process in the first embodiment.

As shown in FIG. 7A, the magnet segment transfer tool 64 moves to a position above the housing part 51 of the empty laminating tool 52. At this time, the magnet segment transfer tool 64 is so positioned that the openable and closable end bottom surface is located right above the opening 51a of the housing part 51.

Figure 7B:
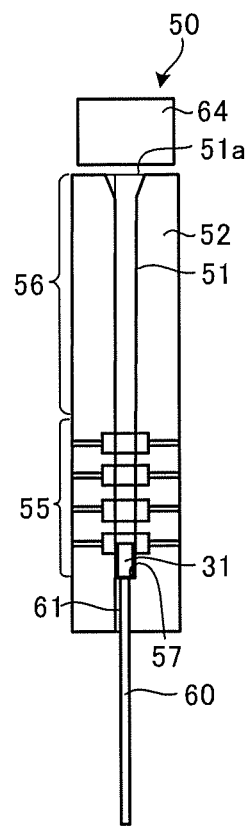
FIG. 7B is a diagram showing the magnet segment lamination process in the first embodiment.

As shown in FIG. 7B, the first magnet segment 31 is thrown into from the magnet segment transfer tool 64. Since the inner dimensions of the bonding region 55 of the housing part 51 are set to be slightly larger than the maximum allowable dimensions of the magnet segment 31, the magnet segment 31 falls down to the bottom surface 57 of the housing part 51 by its own weight.

Figure 7C:
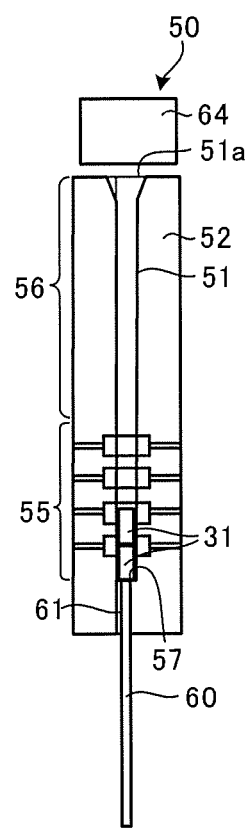
FIG. 7C is a diagram showing the magnet segment lamination process in the first embodiment.

As shown in FIG. 7C, the second magnet segment 31 is thrown into from the magnet segment transfer tool 64. The magnet segment 31 falls down onto the upper surface of the first magnet segment 31 and the cut surfaces of the magnet segments 31 are held in contact with each other.

Figure 7D:
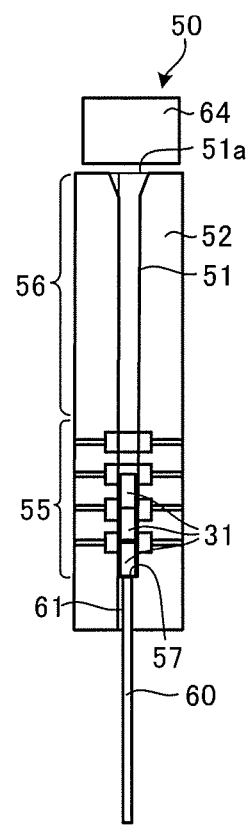
FIG. 7D is a diagram showing the magnet segment lamination process in the first embodiment.
Figure 7E:
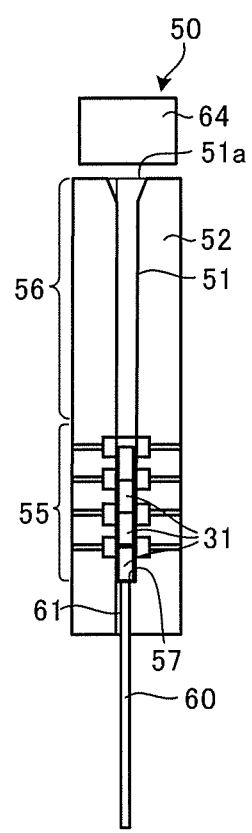
FIG. 7E is a diagram showing the magnet segment lamination process in the first embodiment.
Figure 7F:
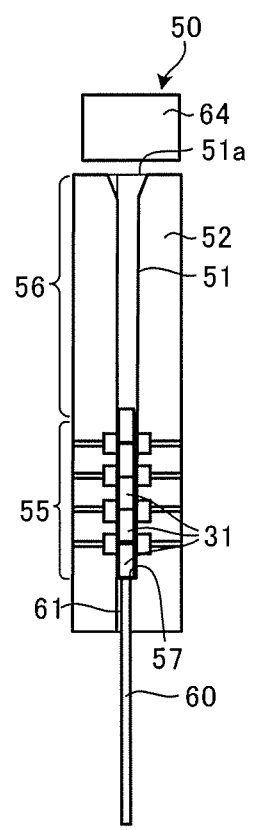
FIG. 7F is a diagram showing the magnet segment lamination process in the first embodiment.

Similarly, as shown in FIGS. 7D, 7E and 7F, the third, fourth and fifth magnet segments 31 are thrown into from the magnet segment transfer tool 64. In this way, five magnet segments 31 are aligned in a row along the longitudinal direction of the housing part 51 with the cut surfaces held in contact with each other. Thereafter, the magnet segment transfer tool 64 is separated from the position right above the housing part 51.

Figure 7G:
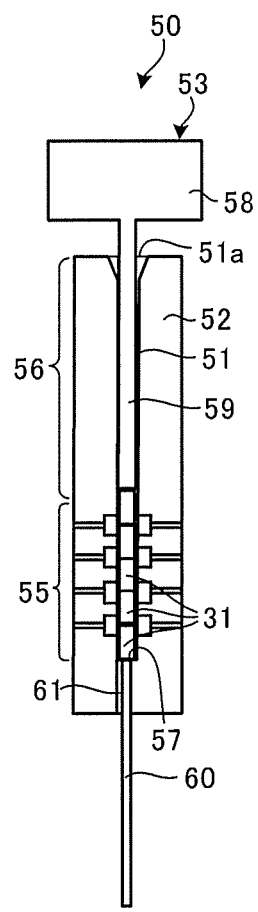
FIG. 7G is a diagram showing the magnet segment lamination process in the first embodiment.

Subsequently, as shown in FIG. 7G, the inserting part 59 of the lid part 53 is inserted into the housing part 51. The inserting part 59 comes into contact with the rear end of the fifth magnet segment 31 and presses the magnet segments 31 downwardly by the own weight of the block part 58. In this way, the five magnet segments 31 are restrained in the longitudinal direction between the inserting part 59 and the bottom surface 57 of the housing part 51. At this time, since the inner side surfaces of the housing part 51 are adjacent to each magnet segment 31 in the width and thickness directions, each magnet segment 31 is restrained in both the width and thickness directions. That is, the five magnet segments 31 are simultaneously restrained in the width, thickness and longitudinal directions only by being pressed downwardly by the lid part 53 in the housing part 51.

Subsequently, the adhesive is cured with the magnet segments 31 restrained as described above. If the used adhesive is thermally curing adhesive, the adhesive is cured by conveying the magnet restraining tool 50 into a heating oven and heating it up to a predetermined temperature.

The adhesive may possibly protrude from the bonding surfaces of the magnet segments 31 in the width or thickness direction by being pressed in the longitudinal direction by the own weight of the lid part 53, but the adhesion of the magnet segments 31 and the laminating tool 52 by the adhesive can be prevented since the grooves 62 are formed over the outer peripheries of the magnet segments 31 on parts of the inner side surfaces of the housing part 51 facing the bonding parts.

Further, even if the vaporization component of the adhesive vaporizes in the heating oven, it can be discharged to outside since the communication holes 63 communicate with the outside atmosphere.

Subsequently, when the adhesive is cured, the magnet restraining tool 90 is carried out from the heating oven. Further, when the lid part 53 is removed from the housing part 51, the bonded and united magnetic body 80 after completion is pushed upward and forced out of the opening 51a of the housing part 51 by the pusher 60. At this time, the magnetic body 80 after completion passes through the guide region 56. Since the inner dimensions of the guide region 56 are set equal to the prescribed dimensions of the magnetic body 80, the magnetic body 80 having passed through this guide region 56 has outer shape dimensions within specs. Thus, it is not necessary to check in the following dimension inspection process whether or not the dimensions of the magnetic body 80 forced out by the pusher 60 in the width and thickness directions are within the specs.

According to the above embodiment, the following effects are achieved.

Since the inner dimensions of the housing part 51 in the bonding region 55 are set to be slightly larger than the maximum allowable dimensions of the magnet segments 31, the laminated magnet segments 31 are restrained in the width and thickness directions by the inner side surfaces of the housing part 51. Thus, the magnet segments 31 can be simultaneously restrained in the width and thickness directions only by being restrained in the longitudinal direction, wherefore the structure of the magnet restraining tool 50 can be simplified, manufacturing cost for the magnet restraining tool 50 can be reduced and a maintenance work can be simplified.

Further, since the restraining operations in the width and thickness directions are not necessary, it is not necessary to prepare drive sources required for the restraining operations and investment in equipment can be reduced by that much.

Furthermore, since the dimensions in the width and thickness directions are specified by the dimensions of the inner side surfaces of the housing part 51, it can be more reliably prevented that the dimensions in the width and thickness directions do not satisfy the specs.

Furthermore, since the magnet segments 31 housed in the housing part 51 are pressed and restrained by the own weight of the lid part 53, maintenance and inspection works for the members for performing the restraining operation become unnecessary and, in addition, a tool structure is simplified as compared with the case using springs or the like. Thus, the maintenance work can be simplified.

Furthermore, since the magnet restraining tool 50 includes the pusher hole 61 on the bottom surface of the housing part 51 and the pusher 60 retractably insertable into the housing part 51 via the pusher hole 61, the united magnetic body after lamination and bonding can be easily forced upward out of the housing part 51.

Furthermore, since the tapered part 54 is provided near the upper end of the housing part 51, a insertion of the magnet segment 31 can be promoted when the magnet segment 31 is thrown into the housing part 51 from the magnet segment transfer tool 64 and a temporary stop of a facility caused by jamming can be prevented.

Furthermore, since the grooves for separating the inner side surfaces from the bonding parts are provided on the parts of the inner side surfaces of the housing part 51 facing the bonding parts of the housed magnet segments 31, the adhesion of the adhesive protruding from the bonding surfaces to the inner side surfaces of the housing part 51 can be prevented when the magnet segments 31 are bonded. Thus, the maintenance work such as the removal of the adhesive depositing on the inner side surfaces of the housing part 51 can be omitted.

Furthermore, since the grooves 62 communicate with the outside atmosphere of the housing part 51, the vaporization component produced when the adhesive is cured can be discharged to outside.

Furthermore, since the inner dimensions of the housing part 51 in the guide region 56 are set at the dimensions of the magnetic body 80 after completion, dimensional inspection in the thickness and width directions is performed by taking the magnetic body 80 after completion out of the housing part 51 by the pusher 60. Thus, the dimension inspection process performed after the lamination process can be simplified.

Next, the second embodiment is described.

The present embodiment is the same as the first embodiment up to the process of cutting the magnetic body 80 and differs in a magnet restraining tool 70 used in the process of laminating the cut magnet segments 31.

Figure 8A:
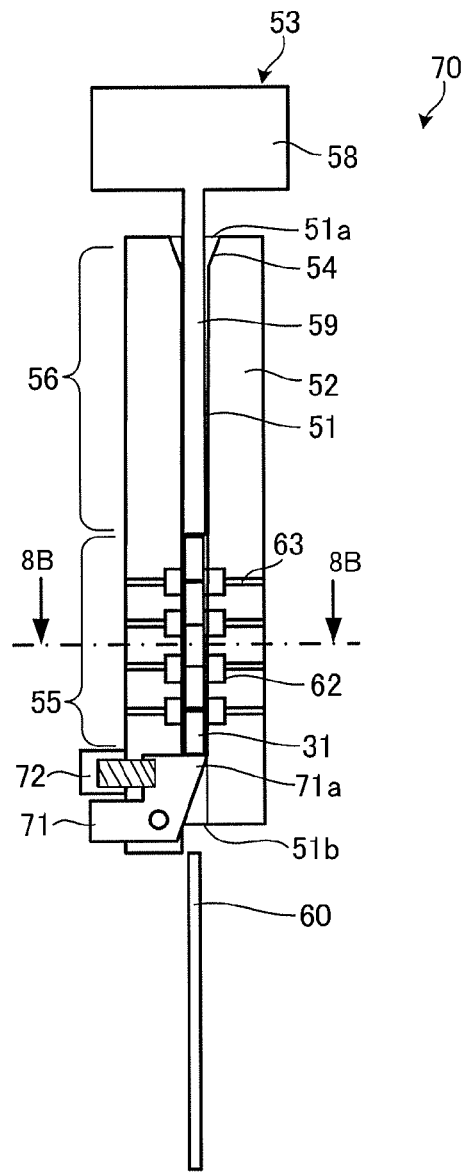
FIG. 8A is a sectional view showing a magnet restraining tool used in a magnet segment lamination process in the second embodiment.
Figure 8B:
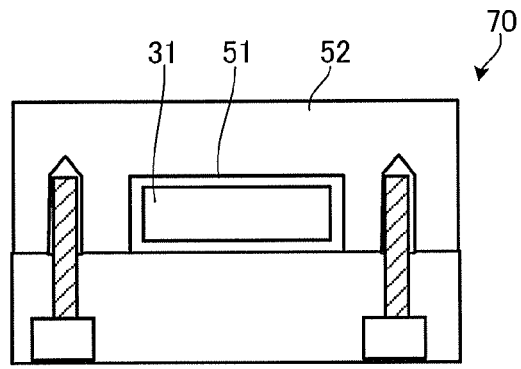
FIG. 8B is a sectional view showing a cross-section along 8B-8B of FIG. 8A.

FIG. 8A is a sectional view showing the magnet restraining tool 70 used in the process of laminating the magnet segments 31 in the present embodiment. FIG. 8B is a sectional view showing a cross-section along 8B-8B of FIG. 8A.

The magnet restraining tool 70 of the present embodiment differs from that of the first embodiment in a throwing-in direction of the magnet segments 31. Although the magnet segments 31 are thrown into by being let to fall down from the upper opening 51a of the housing part 51 in the first embodiment, they are housed into a housing part 51 by being pushed up from below by a pusher 60 in the present embodiment.

Accordingly, the housing part 51 is open on both upper and lower end sides of a laminating tool 52. Specifically, the housing part 51 has no bottom surface and is hollow from the upper surface to the lower surface of the laminating tool 52.

Further, a rotary claw 71 capable of opening and closing the housing part 51 by rotating and a biasing member 72 for biasing the rotary claw 71 to a closing position are provided at a lower end of the laminating tool 52. The rotary claw 71 is biased by the biasing member so that a tip 71a comes into contact with an inner side surface of the housing part 51. When the magnet segment 31 is pushed up from below by the pusher 60, the rotary claw 71 rotates to an opening position against a biasing force of the biasing member 72, thereby opening the housing part 51.

It should be noted that a lower opening 51b of the housing part 51 may be structured to include a tapered part having inner dimensions gradually increased toward the opening 51b.

Next, a lamination process of laminating and bonding the magnet segments 31 using the magnet restraining tool 70 is described with reference to FIGS. 9A to 9G.

The magnet segments 31 are thrown into the housing part 51 of the laminating tool 52 by a magnet segment transfer tool 73 movable to a position below the housing part 51. The number of (e.g. five) magnet segments 31 to be thrown into the housing part 51 are placed on the magnet segment transfer tool 73 in a direction perpendicular to the planes of FIGS. 9A to 9G and an opening is provided on an end upper surface. Further, a hole into which the pusher 60 is retractably insertable is provided on an end lower surface.

When the pusher 60 is lowered to a position lower than the magnet segment transfer tool 73 after elevating the magnet segment 31 on an end part to the housing part 51, the magnet segment transfer tool 73 moves the remaining placed magnet segments 31 toward the end part and allows the magnet segment 31 on the end part to be elevated to the housing part 51 by the pusher 60 again. The magnet segment transfer tool 73 successively throws the number of magnet segments 31 into the housing part 51 by repeating the above operation.

Figure 9A:
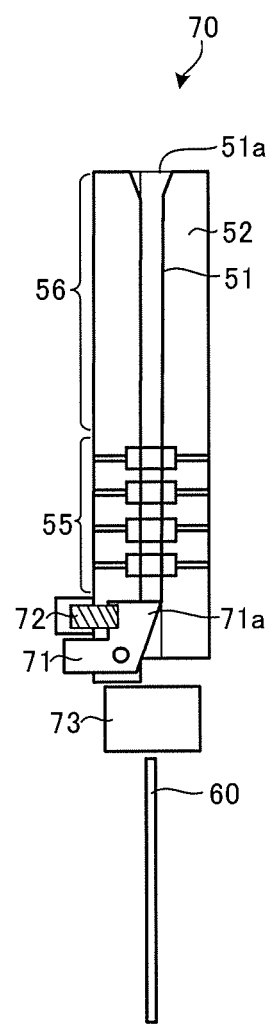
FIG. 9A is a diagram showing the magnet segment lamination process in the second embodiment.

As shown in FIG. 9A, the magnet segment transfer tool 73 moves to the position below the housing part 51 of the empty laminating tool 52. At this time, the opening on the end upper surface of the magnet segment transfer tool 73 is positioned to be located right below the lower opening 51b of the housing part 51.

Figure 9B:
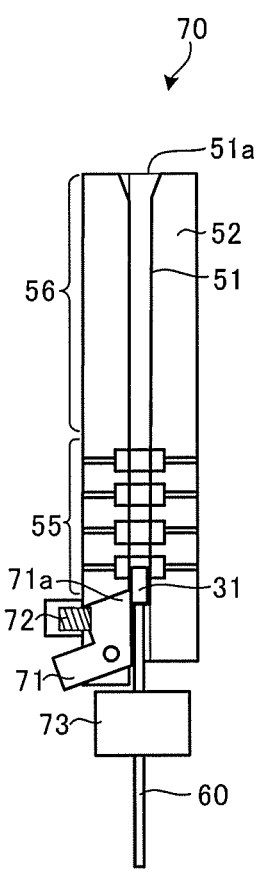
FIG. 9B is a diagram showing the magnet segment lamination process in the second embodiment.

As shown in FIG. 9B, the pusher 60 is elevated and the first magnet segment 31 is pushed into the housing part 51 from the magnet segment transfer tool 73. At this time, the rotary claw 71 pushed by the magnet segment 31 rotates against the biasing force of the biasing member 72 and the magnet segment 31 is pushed further upward than the tip 71a of the rotary claw 71. Thereafter, when the pusher 60 is lowered, the rotary claw 71 closes the housing part 51 again and supports the housed first magnet segment 31. When the pusher 60 is further lowered, the magnet segment transfer tool 73 moves the remaining magnet segments 31 toward the end part.

Figure 9C:
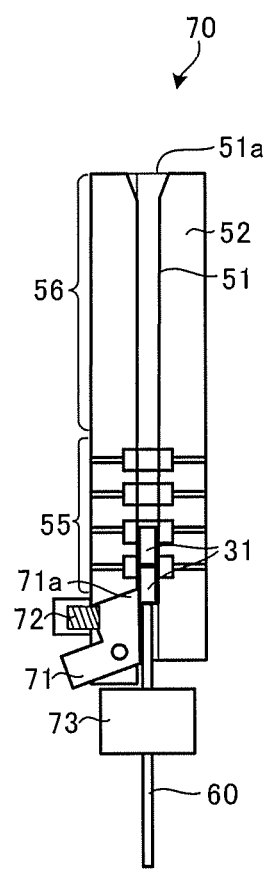
FIG. 9C is a diagram showing the magnet segment lamination process in the second embodiment.

As shown in FIG. 9C, the pusher 60 is elevated and the second magnet segment 31 is pushed into the housing part 51 from the magnet segment transfer tool 73. At this time, the rotary claw 71 pushed by the magnet segment 31 rotates against the biasing force of the biasing member 72 and the cut surfaces of the first and second magnet segments 31 come into contact by an opening movement of the rotary claw 71. The pusher 60 directly elevates the two magnet segments 31 and is lowered after the second magnet segment 31 is pushed further upward than the tip 71a of the rotary claw 71. In this way, the rotary claw 71 closes the housing part 51 again and supports the housed two magnet segments 31.

Figure 9D:
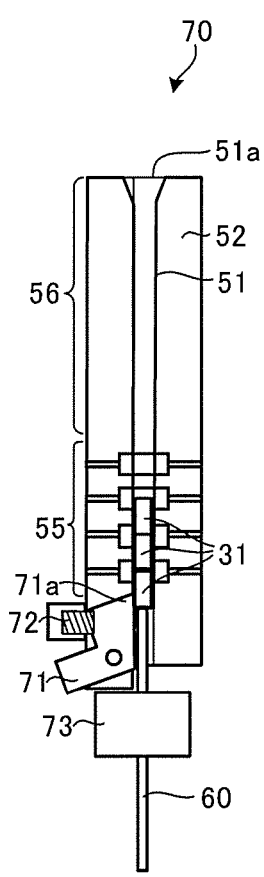
FIG. 9D is a diagram showing the magnet segment lamination process in the second embodiment.
Figure 9E:
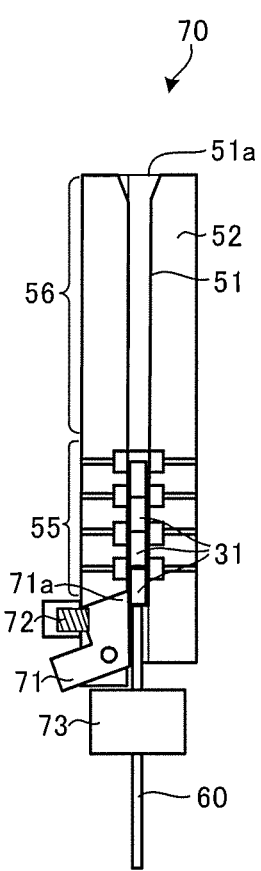
FIG. 9E is a diagram showing the magnet segment lamination process in the second embodiment.
Figure 9F:
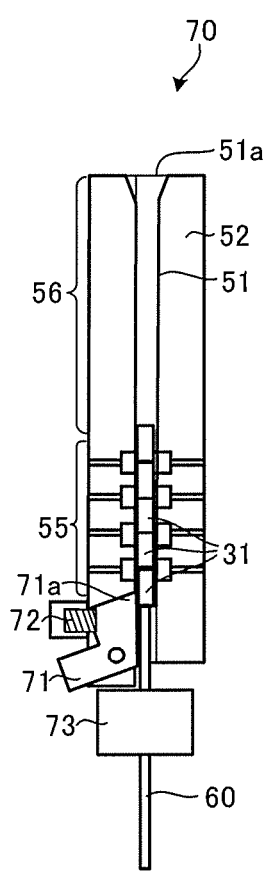
FIG. 9F is a diagram showing the magnet segment lamination process in the second embodiment.

Similarly, as shown in FIGS. 9D, 9E and 9F, the third, fourth and fifth magnet segments 31 are housed into the housing part 51 from the magnet segment transfer tool 73 by the pusher 60. In this way, the five magnet segments 31 are aligned in a row along the longitudinal direction of the housing part 51 with the cut surfaces held in contact with each other. Thereafter, the magnet segment transfer tool 73 is separated from the position right below the housing part 51.

Figure 9G:
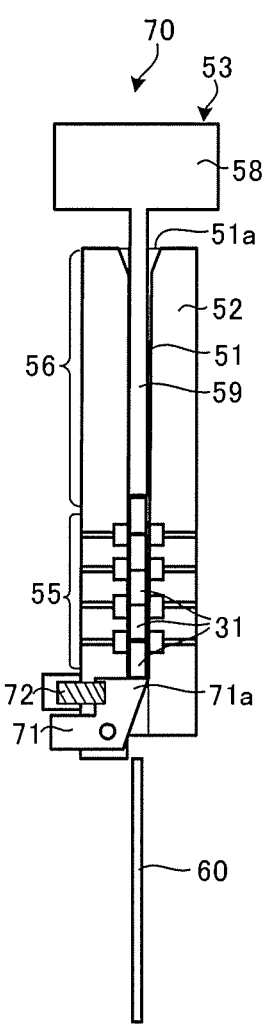
FIG. 9G is a diagram showing the magnet segment lamination process in the second embodiment.

Subsequently, as shown in FIG. 9G, the inserting part 59 of the lid part 53 is inserted into the housing part 51. The following bonding of the magnet segments 31 and force-out of the magnetic body 80 after completion are as in the first embodiment.

According to the above embodiment, the following effects are achieved.

Since the magnet segments 31 are thrown into the housing part 51 of the laminating tool 52 from below the housing part 51 by the pusher 60 particularly in the present embodiment, it can be more reliably prevented that the magnet segments 31 are caught between the inner side surfaces of the housing part 51 when being housed and a production facility is temporarily stopped due to jamming.

Although the embodiments of the present invention have been described above, the above embodiments are merely application examples of the present invention and the technical scope of the present invention is not limited to the specific configurations of the above embodiments. Various changes can be made without departing from the gist of the present invention.

The present application claims a priority of Japanese Patent Application No. 2012-157586 filed with the Japan Patent Office on Jul. 13, 2012, all the contents of which are hereby incorporated by reference.

The invention claimed is:

1. An apparatus for manufacturing a field pole magnetic body formed by laminating magnet segments produced by cutting and dividing a permanent magnet and to be arranged in a rotary electric machine, comprising:
   a housing part configured to successively house a plurality of the magnet segments having adhesive applied to cut surfaces with the cut surfaces facing each other and have an inner side surface adjacent to outer side surfaces of the housed magnet segments; and
   a pressing unit configured to press the magnet segments housed in the housing part toward a bottom part of the housing part in a longitudinal direction,
   wherein the magnet segments are restrained in a width direction and a thickness direction by the inner side surface of the housing part when the magnet segments are pressed by the pressing unit.

2. The apparatus for manufacturing a field pole magnetic body according to claim 1, wherein:
   the housing part is arranged such that the bottom part is located in a lower position; and
   the pressing unit presses the magnet segments toward the bottom part of the housing part by the weight of the pressing unit.

3. The apparatus for manufacturing a field pole magnetic body according to claim 2, further comprising:
   a pusher configured to push the magnet segments in a direction toward a side opposite to the bottom part and force the magnet segments out of the housing part after bonding of the magnet segments by the pressing unit; and
   a pusher hole provided on the bottom part of the housing part from which the pusher is inserted and retracted.

4. The apparatus for manufacturing a field pole magnetic body according to claim 3, wherein:
   the housing part houses the magnet segments from above a top surface; and
   an upper end part of the housing part is formed into a tapered shape having an inner dimension gradually reduced toward a bottom.

5. The apparatus for manufacturing a field pole magnetic body according to claim 3, wherein:
   the bottom part is a rotary member which is biased toward a closing position and makes an opening movement by being pushed upward by the pusher; and
   the housing part houses the magnet segments pushed up from below by the pusher.

6. The apparatus for manufacturing a field pole magnetic body according to claim 1, wherein:
   a groove for separating the inner side surface of the housing part from a bonding part of the housed magnet segments is formed on a part of the inner side surface of the housing part facing the bonding part.

7. The apparatus for manufacturing a field pole magnetic body according to claim 6, wherein:
   the groove communicates with the outside of the housing part.

8. The apparatus for manufacturing a field pole magnetic body according to claim 1, wherein:
   the housing part includes a bonding region where the magnet segments are restrained in the width and thickness directions when the magnet segments are pressed by the pressing unit and a guide region through which the bonded magnetic body pass; and
   an inner dimension of the guide region is set at a dimension of a finished product of the field pole magnetic body.

* * * * *